United States Patent
Faldu et al.

(10) Patent No.: US 11,482,127 B2
(45) Date of Patent: Oct. 25, 2022

(54) SYSTEM AND METHOD FOR BEHAVIORAL ANALYSIS AND RECOMMENDATIONS

(71) Applicant: INDIAVIDUAL LEARNING PRIVATE LIMITED, Karnataka (IN)

(72) Inventors: Keyur Faldu, Bangalore (IN); Achint Thomas, Bangalore (IN); Aditi Avasthi, Bangalore (IN)

(73) Assignee: INDIAVIDUAL LEARNING PVT. LTD., Bangalore (IN)

( * ) Notice: Subject to any disclaimer, the term of this patent is extended or adjusted under 35 U.S.C. 154(b) by 328 days.

(21) Appl. No.: 16/586,525

(22) Filed: Sep. 27, 2019

(65) Prior Publication Data

US 2020/0312178 A1    Oct. 1, 2020

(30) Foreign Application Priority Data

Mar. 29, 2019    (IN) .............................. 201941012400

(51) Int. Cl.
*G09B 7/077*    (2006.01)
*G09B 7/02*    (2006.01)
*G06Q 50/22*    (2018.01)

(52) U.S. Cl.
CPC .............. *G09B 7/077* (2013.01); *G06Q 50/22* (2013.01); *G09B 7/02* (2013.01)

(58) Field of Classification Search
CPC ................................. G09B 7/02; G09B 7/077
USPC ........................................................ 434/362
See application file for complete search history.

(56) References Cited

U.S. PATENT DOCUMENTS

| | | | |
|---|---|---|---|
| 7,110,989 B2 | 9/2006 | Iemoto et al. | |
| 9,558,675 B2 | 1/2017 | Lovett et al. | |
| 10,043,409 B1* | 8/2018 | Nash | G09B 7/02 |
| 11,043,135 B2* | 6/2021 | Chapman | G09B 5/00 |
| 2004/0241629 A1* | 12/2004 | Ondrusz | A63B 71/06 |
| | | | 434/247 |
| 2006/0110718 A1* | 5/2006 | Lee | G09B 7/02 |
| | | | 434/350 |
| 2007/0087313 A1* | 4/2007 | Vest | G09B 5/00 |
| | | | 434/236 |
| 2007/0099169 A1* | 5/2007 | Beamish | G09B 7/02 |
| | | | 434/362 |
| 2008/0090221 A1* | 4/2008 | Ashby | G09B 7/06 |
| | | | 434/350 |

(Continued)

FOREIGN PATENT DOCUMENTS

IN           30/2016        7/2016

*Primary Examiner* — Thomas J Hong
(74) *Attorney, Agent, or Firm* — Maschoff Brennan (57) ABSTRACT

A method and system for analysing behaviour of a plurality of users for recommending a change in at least one behavioural attribute to at least one of the plurality of users for changing at least one effect of the behavioural attribute along with an estimated improvement in performance is disclosed. The method comprises, analysing activity data of the plurality of users and a context of the activity for determining one or more behavioural attributes of each of the plurality of users, assigning a value to each behavioural attribute of each of the plurality of users, determining a percentile score for each users for each of the one or more behavioural attributes and recommending, to at least one user, a change in at least one behavioural attribute and a magnitude of change and a direction of change, based on the percentile score correlated with better performance.

6 Claims, 4 Drawing Sheets

(56) References Cited

U.S. PATENT DOCUMENTS

| | | | | |
|---|---|---|---|---|
| 2010/0253905 | A1* | 10/2010 | Lawton | G09B 19/00 351/203 |
| 2012/0028230 | A1* | 2/2012 | Devereux | G09B 19/00 434/236 |
| 2013/0041487 | A1* | 2/2013 | Messner | A63B 57/00 700/91 |
| 2013/0096892 | A1* | 4/2013 | Essa | G06F 17/18 703/2 |
| 2014/0030689 | A1* | 1/2014 | Schottenstein | G09B 7/06 434/353 |
| 2014/0039651 | A1* | 2/2014 | Crowley | G16H 20/30 700/91 |
| 2014/0120516 | A1* | 5/2014 | Chiang | G09B 5/02 434/362 |
| 2014/0188574 | A1* | 7/2014 | Luca | G06Q 10/06393 705/7.39 |
| 2014/0349272 | A1 | 11/2014 | Kutty et al. | |
| 2015/0050637 | A1* | 2/2015 | James-Hatter | G09B 5/08 434/362 |
| 2015/0279220 | A1 | 10/2015 | Ming et al. | |
| 2015/0279227 | A1* | 10/2015 | Huber | G09B 7/02 434/353 |
| 2015/0302755 | A1* | 10/2015 | Breck | G09B 5/12 434/362 |
| 2015/0364051 | A1* | 12/2015 | Razack | G09B 7/00 434/322 |
| 2016/0217701 | A1* | 7/2016 | Brown | G09B 7/00 |
| 2017/0061817 | A1* | 3/2017 | Mettler May | G09B 19/003 |
| 2017/0092145 | A1* | 3/2017 | Lin | G09B 7/02 |
| 2017/0154539 | A1* | 6/2017 | King | G09B 5/02 |
| 2017/0278417 | A1* | 9/2017 | Ur | G06F 21/316 |
| 2018/0012507 | A1* | 1/2018 | Jeong | G09B 7/08 |
| 2018/0090023 | A1* | 3/2018 | Faldu | G09B 7/00 |
| 2018/0144655 | A1* | 5/2018 | Wu | G09B 5/02 |
| 2018/0151083 | A1* | 5/2018 | Yoo | G09B 5/08 |
| 2018/0225981 | A1* | 8/2018 | Loo | C11B 1/108 |
| 2019/0001188 | A1* | 1/2019 | Davis | A63B 71/0622 |
| 2019/0009133 | A1* | 1/2019 | Mettler May | A63B 24/0075 |
| 2019/0080628 | A1* | 3/2019 | Olsen | G09B 5/00 |
| 2019/0116093 | A1* | 4/2019 | Capps | G09B 7/04 |
| 2019/0130511 | A1* | 5/2019 | Davier | A61B 5/486 |
| 2019/0347949 | A1 | 11/2019 | Casa | G09B 19/18 |
| 2020/0302296 | A1* | 9/2020 | Miller | G06N 3/0427 |
| 2020/0311152 | A1* | 10/2020 | Faldu | G06F 16/90348 |

* cited by examiner

SYSTEM AND METHOD FOR BEHAVIORAL ANALYSIS AND RECOMMENDATIONS

PRIORITY STATEMENT

The present application hereby claims priority to Indian patent application number "201941012400" filed on 29 Mar. 2019, the entire contents of which are hereby incorporated herein by reference.

TECHNICAL FIELD

The present disclosure generally relates to methods and systems for data analysis, behavioural analysis, and more particularly to a system and method for behavioural analysis and recommendations.

BACKGROUND

Education is a process of facilitating learning, or acquisition of cognitive skills, knowledge, values, beliefs, and habits, and has evolved since ancient times when the teacher and the students used to live together, and the students were taught philosophy, science, arts, administration and other subjects and techniques. It is desirable to educate individual students with different education programs adapted to the respective student. For this purpose, human resources must be concentrated on the preparation of many different teaching materials and programs. In addition, at least one teacher must be assigned to one student or to a small group of students. However, in today's education system, the student to teacher ratio is highly disproportionate and teachers are not able to provide personalized, individual attention to each and every student effectively.

Further, standardized tests have become the foundation of education, means for measuring success, and testing the students' knowledge. The performance of the students on standardized tests, however, is usually not only a factor of academic preparedness and learning ability. Various studies have shown that the student's behaviour plays a vital role in learning outcomes and performance on various competitive tests, such as standardized tests. Further, qualitative analysis of students' behaviour has been used in prior art solutions for recommending pedagogy. Furthermore, systems and methods are known in the art for carrying out both qualitative and quantitative analysis of users' behaviour for assessing their situational judgment. However, existing solutions do not teach monitoring of behavioural traits of a user in a continuous manner while the user is imbibing content, for example a test, a concept in the syllabus, etc. This is particularly important for progressively measuring performance improvement as well as for recommending progressive goals to the user.

In view of the problems associated with conventional systems and devices, there exists a need for a means of recommending goal based learning which has higher likelihood of leading to better performance.

SUMMARY OF THE INVENTION

A method and a system for analysing behaviour of each of a plurality of users each performing an activity using a user device, for recommending a change in at least one behavioural attribute to at least one of the plurality of users for changing at least one effect of the behavioural attribute is disclosed. In one embodiment, the method comprises, analysing activity data of the plurality of users and a context of the activity, the activity data obtained while each of the plurality of users is performing an activity, for determining one or more predetermined behavioural attribute of each of the plurality of users, assigning a value for each of the one or more behavioural attributes of each of the plurality of users based on at least one of, user activity data, context of an activity, and a user's profile, determining a percentile score for each of the plurality of users for each of the one or more behavioural attributes, and recommending, to the at least one user, a change in the at least one behavioural attribute and a magnitude of change and a direction of change in the at least one behavioural attribute based on at least one of the percentile score of the at least one user for the at least one behavioural attribute, and the percentile scores of each of the plurality users for the at least one behavioural attribute, in relationship with an effect of the at least one behavioural attribute.

In one embodiment, the method for recommending, to the at least one user, the change in the at least one behavioural attribute, the magnitude of change, and the direction of change in the at least one behavioural attribute comprises, determining a preferred percentile score based on the percentile scores of the plurality of users, for the at least one behavioural attribute and preferred effect of the behavioural attribute, generating one or more goals based on the percentile score of the at least one user for the at least one behavioural attribute and the preferred percentile score, and recommending the one or more goals to the at least one user.

BRIEF DESCRIPTION OF THE FIGURES

The disclosed system and method will be described and explained with additional specificity and detail with the accompanying figures in which.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION OF THE EXEMPLARY EMBODIMENTS

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying figures.

The present disclosure discloses embodiments of a system and a method for analysing the behaviour of each of a plurality of users each performing an activity using a user device, for recommending a change in at least one behavioural attribute to at least one of the plurality of users for changing at least one effect of the behavioural attribute. In a preferred embodiment of the present disclosure, one or more predefined behavioural attributes of the plurality of users are determined from user activity data obtained while each of the plurality of users is performing an activity and a context of the activity. The "activity" as described herein may be one of an academic activity including but not limited to learning, practising or attending an online or offline test, a gaming activity, simulation based training and learning activities, etc., which are usually performed on a device associated with the users or on a dedicated electronic devices, such as a simulator. Further, the "user activity data" as described herein comprises at least a click stream data, and the user activity data is obtained in real-time or near-real-time while each of the plurality of user are performing the activity. User activity data thus obtained and the context of the activity are analysed to determine the one or more predefined behavioural attributes of the plurality of users. It may be noted that the users need not perform the activities simultaneously or concurrently. The important point is that the data is collected as and when the activity occurs. Then, a value is assigned to each of the one or more behavioural attributes of each of the plurality of users, wherein the value is assigned based on at least one of the user activity data, context of the activity, and the user's profile. Further, a percentile score is determined for each of the plurality of users for each of the one or more behavioural attributes. Then a change in the at least one behavioural attribute, a change in the at least one behavioural attribute in terms of the magnitude of change and a direction of change in the at least one behavioural attribute is recommended to the at least one user based on at least one of the percentile score of the user for the at least one behavioural attribute, and the percentile scores of one or more users among the plurality users for the at least one behavioural attribute, in relationship with an effect of the at least one behavioural attribute. Hence, the method and system disclosed in the present disclosure enables the users to achieve higher or better or more preferred learning outcomes in future activities, for example, to improve test scores, performance in practises, engagement in learning, and the like. Further, in one embodiment of the present disclosure, the one or more behavioural attributes are ranked based on likelihood of the possible impact on learning outcomes of the users. In another embodiment of the present disclosure, the one or more behavioural attributes of each of the plurality of users are further analysed to determine one or more behavioural traits exhibited by each of the plurality of users. Then a change in the one or more behavioural traits of the each of the plurality of users, in relationship with an effect of the at least one behavioural attribute, is recommended to the at least one user to achieve higher learning outcomes in future activities.

As described, the system may be implemented in order to help the users to achieve higher learning outcomes in any activity, by analysing the one or more behavioural attributes determined from the context of the activity and the user activity data obtained while the user is performing the activity such as learning, practising or attending an online or offline test. However, for sake of brevity and ease of understanding, the present disclosure is described by considering an example of a plurality of students attending an online test, an academic activity.

Accordingly, considering an academic activity, the term "behavioural traits" as described herein refers to one or more of lack of intent, boredom, attention gaps, stamina, carelessness, overconfidence, fear, pressure, fluke, time management, prioritization, etc. Further, the term "one or more predefined behavioural attributes/one or more behavioural attributes" as described herein refers to one or more of a First Look Accuracy, Too Fast Corrects, Wasted Attempts, Non Attempt Time, Looked Ratio, First Look Overtime, Overtime Incorrect, First Look Attempts, First Look Time, etc. It is to be noted that the role and the meaning of the behavioural traits and the one or more behavioural parameters are explained in detail further in the present disclosure.

Figure 1:
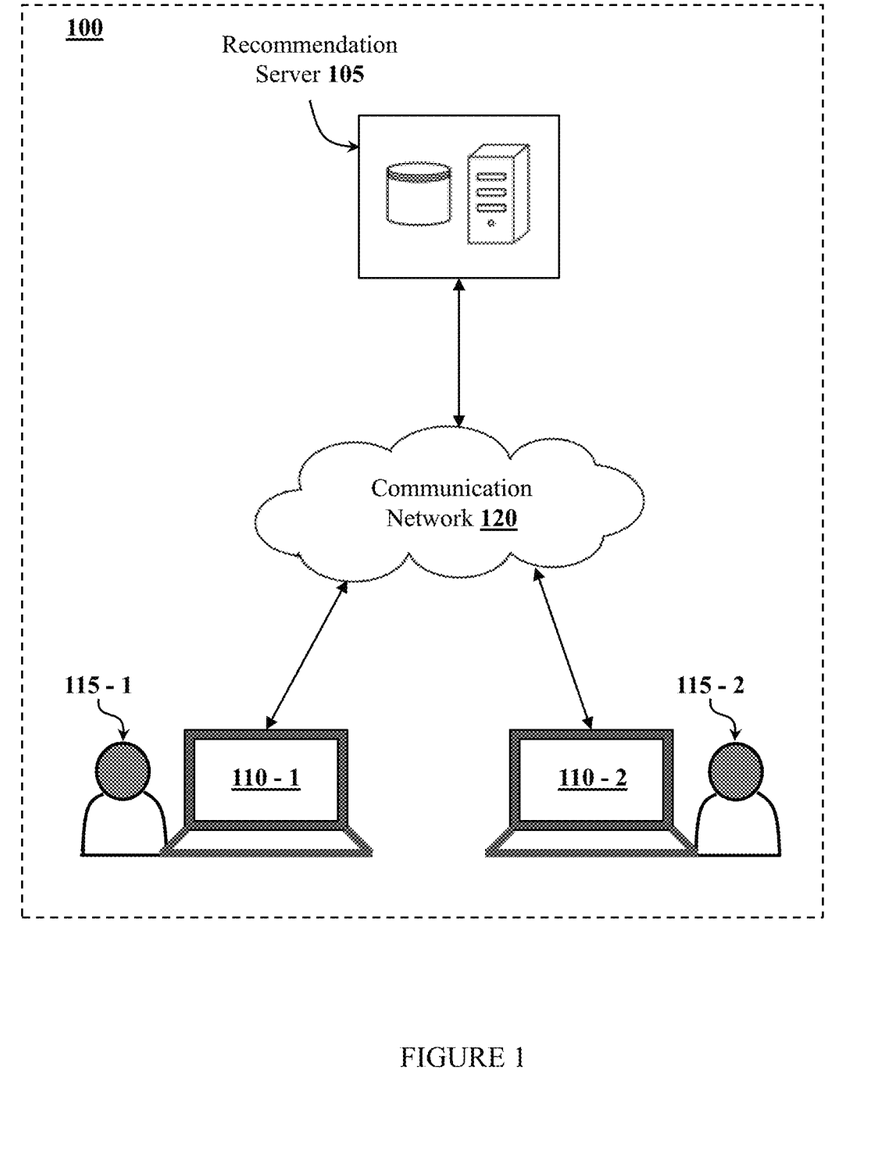
FIG. 1 illustrates an exemplary system for behavioural analysis and recommendations in accordance with an embodiment of the present disclosure.

FIG. 1 illustrates an exemplary system for behavioural analysis and recommendations in accordance with an embodiment of the present disclosure. As shown, the system 100 comprises a recommendation server 105, a plurality of user devices 110-1 and 110-2 (only two user devices are shown and hereafter referred as user device 110) associated with a plurality of users 115-1 and 115-2, and a communication network 120, wherein the recommendation server 105 and the plurality of user devices 110-1 and 110-2 are communicatively connected via the communication network 120.

The recommendation server 105 may include, for example, a computer server or a network of computers or a virtual server which provides functionalities or services for other programs or devices such as for the user device 110. In one implementation, the recommendation server 120 is a cloud server comprising one or more processors, associated processing modules, interfaces and storage devices communicatively interconnected to one another through one or more communication means for communicating information. The storage associated with the recommendation server 105 may include volatile and non-volatile memory devices for storing information and instructions to be executed by the one or more processors and for storing temporary variables or other intermediate information during processing. In one embodiment of the present disclosure, the recommendation server 105 is configured for analysing behaviour of each of a plurality of users and recommending a change in at least one behavioural attribute to at least one of the plurality of users, for achieving a change in at least one effect of the behavioural attribute. Accordingly, the recommendation server 105 is configured for determining the one or more predetermined behavioural attributes of the plurality of users from the context of the activity and the user activity data obtained while each of the plurality of users is performing an activity, determining one or more behavioural traits exhibited by each of the plurality of users, assigning a value for each of the one or more behavioural attributes of each of the plurality of users based on at least one of the user activity data, context of the activity, and the user's profile, and determining a percentile score for each of the plurality of users for each of the one or more behavioural attributes. Further, the recommendation server 105 is configured for recommending, to the at least one user, a change in the at least one behavioural attribute, a magnitude of change and a direction of change in the at least one behavioural attribute based on at least one of the percentile score of the at least one user for the at least one behavioural attribute, and the percentile scores of one or more users among the plurality users for the at least one behavioural attribute, in relationship with an effect of the at least one behavioural attribute. The manner in which the recommendation server 105 performs one or more said actions is described in detail further below in the present disclosure.

The user device 110 may be any computing device that often accompanies their users 115 to perform various activities such as for learning, taking online or offline tests, etc. Alternatively, the user device 110 may be any machine designed to provide a realistic imitation of the controls and operation of a vehicle, aircraft, or other complex system, used for learning and training purposes. By way of example, the user device 110 may include a computer, a laptop, a notebook computer, a tablet, a simulator, and the like, having communication capabilities. The user device 110 may communicate with the recommendation server 105 through the communication network 120 in one or more ways such as wired, wireless connections or a combination thereof. It will be appreciated by those skilled in the art that the user device 110 comprises one or more functional elements capable of communicating through the communication network 120 to receive one or more services offered by the recommendation server 105. In one embodiment of the present disclosure, a user/student may register with the system 100 for taking online tests or for performing any academic activities such as learning, practising, etc., and for receiving behavioural recommendations in order to score higher marks in tests or to improve their performance, or to enhance their learning outcomes. It is to be noted that the student may register with the system 100 using a dedicated web interface or an application by providing necessary credentials, for example, a user name, password, contact details, payment details, and the like. Upon successful one time registration, the student may use the system 100 for receiving various behavioural recommendations. It is to be noted that an unregistered student/user may also use the system for receiving various behavioural recommendations. However, the registration process only enables the students to input their personal and academic information such as grade, university, syllabus, interests, etc., and hence to create a user profile. The manner in which the recommendations are generated and communicated to the student is described in detail further in the present disclosure.

The communication network 120 may be a wireless network or a wired network or a combination thereof. Wireless network may include long range wireless radio, wireless personal area network (WPAN), wireless local area network (WLAN), mobile data communications such as 3G, 4G or any other similar technologies. The communication network 120 may be implemented as one of the different types of networks, such as intranet, local area network (LAN), wide area network (WAN), the internet, and the like. The communication network 120 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Further the communication network 120 may include a variety of network devices, including routers, bridges, servers, modems, computing devices, storage devices, and the like. In one implementation, the communication network 120 is internet which enables communication between the recommendation server 105 and the plurality of user devices 110 of the system 100 as shown.

As described, in one embodiment of the present disclosure, the user activity data of each of a plurality of users is obtained while the each of the plurality of users 115 is performing an activity on their respective user devices 110, wherein the user activity data is obtained in real-time or near real-time, along with timestamps. Then the one or more behavioural attributes are determined for each of the plurality of users, from the context of the activity and the user activity data of the each of the plurality of users, and the one or more behavioural attributes are analysed, both qualitatively and quantitatively, for recommending the change in the at least one behavioural attribute, the magnitude of change and the direction of change in the at least one behavioural attribute to the one or more users 115 among the plurality of users 115. The manner in which the system analyses and recommends change in the at least one behavioural attribute, the magnitude of change and the direction of change in the at least one behavioural attribute is described in detail further below, considering an academic activity (online test) and a plurality of students performing the academic learning activity.

Figure 2:
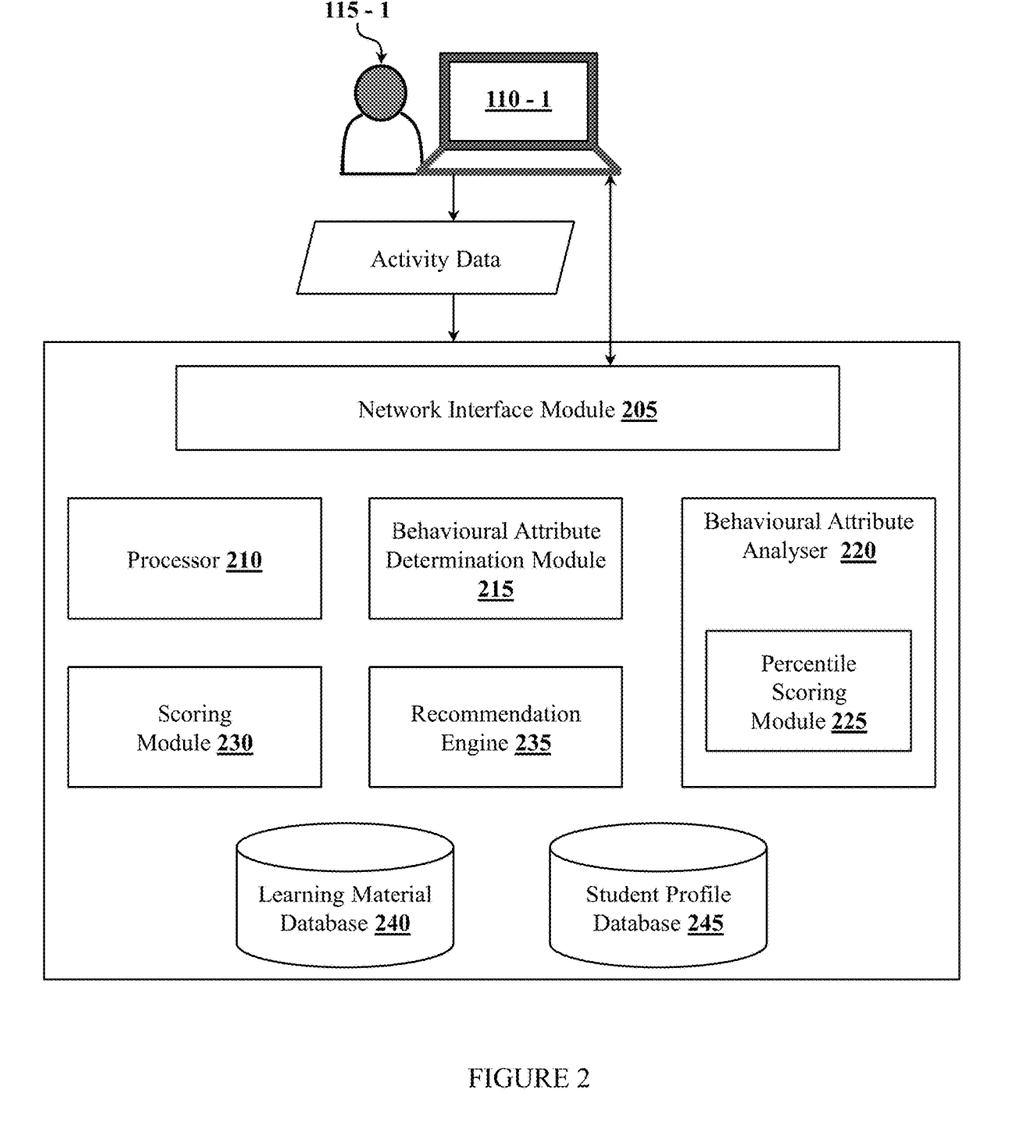
FIG. 2 is a block diagram of an exemplary recommendation server 105 in accordance with an embodiment of the present disclosure.

FIG. 2 is a block diagram of an exemplary recommendation server 105 in accordance with an embodiment of the present disclosure. As shown, the recommendation server 105 comprises a network interface module 205, a processor 210, a behavioural attribute determination module 215, a behavioural analysis module 220, a percentile scoring module 225, a scoring module 230, a recommendation engine 235, a learning material database 240, and a student profile database 245. It is to be noted that the recommendation server 105 may include other functional blocks, multiple processors, and volatile and non-volatile memory devices for storing information and instructions to be executed by the one or more processors and for storing temporary variables or other intermediate information during processing.

The network interface module 205 enables communication between the recommendation server 105 and the one or more user devices 110 through the communication network 120. In one embodiment of the present disclosure, the learning material database 240 comprises plurality of question papers/tests for different grades, subjects, exams, etc. Typically, such question papers are designed for training students of various categories, and may be designed in any known format such a text, video, audio, interactive type and the like. In addition, the learning material database 240 may comprise a plurality of study materials for students preparing for different exams, in any known format. In another embodiment of the present disclosure, the learning material database 240 further stores metadata associated with the learning materials, the metadata defining context of the learning activity. For example, each question is tagged with parameters such as an ideal time to solve the question, minimum and maximum time to solve the question, average difficulty level, bloom level, academic concepts, syllabus or chapters associated with the question, etc.

In one embodiment of the present disclosure, the student profile database 245 stores a plurality of registered users/students data, the data including but not limited to personal information such as name, age, gender, contact information, etc., present and past academic information such as grade, university, syllabus, scores, etc., and other information including learning behaviour, interests, skills, past test scores, proficiency over one or more concepts, behavioural standing over one or more concepts, and learning maps (like chapter, unit, subjects etc.), preferences of academic engagement, etc. Such information may be collected and stored from the plurality of students, or may be determined and stored based on historical data of the plurality of students. It is to be noted that the personal information may or may not be stored based on the students' preference, and data relating to academic context is collected from the plurality of students or inferred based on the plurality of students' activity.

As described, the user activity data of each of the plurality of students obtained during the online test, the context of the academic activity, and the student's profile are used for analysing the behaviour of the plurality of students, and for recommending a change in the at least one behavioural attribute, the magnitude of change and the direction of change in the at least one behavioural attribute to the at least one student among the plurality of students.

Referring back to FIG. 2, in one embodiment of the present disclosure, the user activity data of each of the plurality of students is obtained in real-time or near real-time, along with timestamps, while the each of the plurality of students is attending or answering the online test using the user device 110. The user activity data as described herein may comprise clickstream events captured using one or more input means such as mouse, such as mouse movements, clicks, navigations, time duration between the clicks, etc., a video or one or more images captured using a camera of the user device 105, facial expression of the student while attending the online test, and the like, along with the user device ID, webpage ID for web-based content or screen ID for application-based content. In one example, the clickstream events of a student may include the student looking at a question based on the mouse movements and content displayed, choosing an answer option, changing an answer option, marking a question for review, attempting a question, swapping subjects, navigating to different webpages, etc. In one implementation, raw data is obtained using RESTful web services, for example, or using any known methods, and processed to obtain the user activity data. In a preferred embodiment of the present disclosure, the user activity data is obtained while the student is attending or answering the online test delivered by the recommendation server 205. Alternatively, the user activity data may be obtained while the student is attending or answering an online test submitted by any third party servers. In such an event, context of academic content which students interacting (context of academic activity) with is also obtained along with the user activity data. User activity data thus obtained is temporarily stored in the memory module or in their respective user profile databases 245.

In one embodiment of the present disclosure, the behavioural attribute determination module 215 determines the one or more behavioural attributes of each of the plurality of students from the context of the activity and the activity data obtained in real-time or near real-time. That is, upon receiving the user activity data, the behavioural parameter derivation module 215 analyses the user activity data with reference to the context of the academic activity, that is, with reference to the metadata associated with the test, and determines the one or more behavioural attributes of each of the plurality of students (particularly for the given test or academic activity). As described, the one or more behavioural attributes may include a First Look Accuracy, Too Fast Corrects, Wasted Attempts, Non Attempt Time, Looked Ratio, First Look Overtime, Overtime Incorrect, First Look Attempts, First Look Time, etc. Considering an example test having ten multiple choice questions, based on the user activity data comprising click stream events and time stamps, and the metadata comprising answers, ideal time to solve each question, average difficulty level, etc., the behavioural attribute determination module 215 determines the one or more behavioural attributes of each of the plurality of students for that particular test. Below table "Table 1" lists exemplary behavioural attributes and description of the same.

TABLE 1

Exemplary Behavioural Parameters

| Behavioural Attributes | Description |
| --- | --- |
| First Look Accuracy | Correct answers among questions attempted during the first look |
| Too Fast Corrects | The ratio of correct answers when they are too fast (i.e. time taken is less than a threshold of ideal time) attempts to all attempts |
| Wasted Attempts | the ratio of too fast incorrect (i.e. careless mistakes) to all attempts |
| Non Attempt Time | the ratio of time spent on non-attempts to total time spent |
| Looked Ratio | the ratio of questions looked to total questions |
| First Look Overtime Incorrects | the ratio of overtime incorrect in first look to all attempts |
| Overtime Incorrects | the ratio overtime incorrect answers to all attempts |

TABLE 1-continued

Exemplary Behavioural Parameters

| Behavioural Attributes | Description |
| --- | --- |
| First Look Attempts | the ratio of first look attempts to all attempts |
| First Look Time | the ratio of time spent on first look questions to total time spent |

Now, referring to Table 1, the behavioural attribute determination module 215 determines the behavioural attribute as "Too Fast" and tags the same for a question answered by the student if the time taken for an attempt on the question is less than a threshold, as a percentage of the ideal time (metadata) to solve the given question, for example. In another example, behavioural attribute is determined as "Overtime" for the question if the time taken for an attempt on the question is greater than the ideal time to solve the given question. Similarly, one or more behavioural attributes are determined for the each of the plurality of students for the given test. In one embodiment of the present disclosure, the scoring module 230 calculates total score for each activity for each of the plurality of users. In this example, the scoring module 230 calculates the marks obtained by the each student in the given activity and the marks are used for determining one or more behavioural attributes of the students, for example, Too Fast Corrects, Overtime Incorrects, First Look Overtime Incorrects, etc.

Then, in one embodiment of the present disclosure, the behavioural attribute analyser 220 assigns a value for each of the one or more behavioural attributes of each of the plurality of students based on at least one of, the student activity data (user activity data), the context of the activity, and the user's profile. In other words, considering one student, the behavioural attribute analyser 220 assigns a value for each of the one or more behavioural attributes of the student based on at least one of, the student activity data, the context of the activity, and profile of the user. For example, a value is assigned for the behavioural attribute "Overtime" based on the time taken for an attempt on the question (student activity data) in comparison with the ideal time to solve the given question (context of the activity), and the proficiency of the student (student's profile). In other words, the behavioural attribute "Overtime" is calibrated based on the time taken for an attempt on the question in comparison with the ideal time to solve the given question. Similarly, a score is assigned to each of the one or more behavioural attributes of each of the plurality of students for the given test.

Then, the percentile scoring module 225 determines and assigns a percentile score to each of the plurality of students for each of the one or more behavioural attributes. In one embodiment of the present disclosure, the percentile score for each of the plurality of students for each of the one or more behavioural attributes is determined based on the assigned values associated with each of the one or more behavioural attributes of other students among the plurality of students performing the activity. In other words, considering one student and one behavioural attribute, a percentile score for the student for the behavioural attribute is determined based on values associated with the behavioural attribute of other students performing the activity.

In one embodiment of the present disclosure, the percentile score defines the impact of the one or more behavioural attributes on the students' performance. For example, a percentile score of "51" or "0.51" for a student for a behavioural attribute "First Look Accuracy" defines that the student's behavioural attribute value/score is higher than 50% of the plurality of students who attended the same online test. Similarly, a percentile score for each of the plurality of students for each of the one or more behavioural attributes are assigned using the percentile scoring module 225.

Then, a change in the at least one behavioural attribute, a magnitude of change and a direction of change in the at least one behavioural attribute is recommended to one or more students based on the percentile scores of the one or more students for the at least one behavioural attributes. In one embodiment of the present disclosure, the recommendation engine 235 determines the change in the at least one behavioural attribute, the magnitude of change and the direction of change in the at least one behavioural attribute, for the at least one student, based on at least one of the percentile score of the at least one student for the at least one behavioural attribute, and the percentile scores of the plurality users for the at least one behavioural attribute, in relationship with an effect of the at least one behavioural attribute.

In one implementation, the recommendation engine 235 determines a preferred percentile score for each of the behavioural attribute based on the percentile scores of one or more users, for the each of the behavioural attribute. In one embodiment, the preferred percentile score for a given behavioural attribute is the percentile where the performance of the one or more students, in terms of the marks scored in the test for example, is highest, determines an effect of the behavioural attribute on the performance of the student to enhance learning outcomes. Then, based on the percentile score of the one or more students for the at least one behavioural attribute, and the preferred percentile score for the behavioural attribute, the recommendation engine 235 generates one or more goals and recommends the same to the one or more students. In one embodiment of the present disclosure, the one or more goals define the change in the one or more behavioural attributes, the magnitude of change and the direction of change in the one or more behavioural attributes.

For example, considering one student, the recommendation engine 235 compares the percentile score of the student for a behavioural attribute (for example, Looked Ratio) with the preferred percentile score for the same behavioural attribute. Based on the result of the comparison, the recommendation engine 235 generates and recommends one or more goals to improve the percentile score, and hence to score higher marks in future tests or to improve the performance of the student or to enhance learning outcomes. Similarly, the one or more goals, defining a change or a magnitude and direction of change in a behavioural attribute, are generated and recommended for each of the plurality of students for each of the one or more behavioural attributes in order to help the student to score higher marks in future tests or to improve the performance of the student or to enhance learning outcomes. In one embodiment of the present disclosure, the recommendation engine 235 is further configured for estimating the improvement in the student's performance based on the change or the magnitude and the direction of change in the behavioural attribute toward the preferred percentile score.

It is to be noted here that the meaning of the term direction of change is as follows. Some attributes, "first look time" on the total score for example, may have a certain value for a particular user with seconds as the unit. The percentile score of the user is "0.50", for example. If it is noted, based on all the other user data, that the preferred percentile score for the given behavioural attribute is "0.75" (the percentile where performance of students is highest), then the direction recommended to the user with the percentile score of "0.50" may be treated as positive or upward or higher or faster. Thereby indicating to the user to whom the recommendation is made that the user should spend more time to analyse each question. Thus, the term direction is dependent on the attribute, the percentile score of the user, and the percentile score of the other users having a higher performance. A person skilled in the art will be able to understand that different attributes may have different directions of change for the same user.

Figure 3:
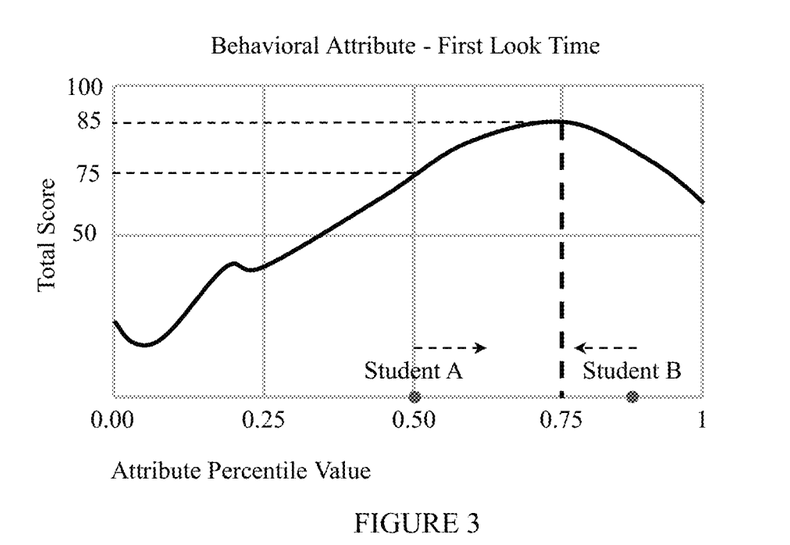
FIG. 3 illustrates a graphical representation of the impact of the percentile score of the students for the "First Look Time" attribute on the total score obtained in a given test.

The manner in which the preferred percentile score is determined for a behavioural attribute, and used for recommending a change or a magnitude and direction of change in a behavioural attribute is described in detail referring to FIG. 3. FIG. 3 illustrates a graphical representation of the impact of the percentile score of the students for the "First Look Time" attribute on the total score obtained in a given test. As illustrated, the percentile score of the plurality of students for the behavioural attribute "First Look Time" is plotted against the total score obtained in the test. The "first look time" is a maximum time for which a student looked at any question for the first time, and lower first look time means that the student has gone through the complete question paper (test) in less time. In this example, a preferred percentile score is determined based on the impact of the behavioural attribute "first look time" on the total score and hence determined as "0.75" (as indicated by the dotted line). Then for any given student, for example for a student "A" having a percentile score of "0.50", the recommendation engine 235 compares the percentile score of the student "A" for a behavioural attribute "first look time" with the preferred percentile score "0.75". Then the recommendation engine 235 generates and recommends one or more goals to improve the percentile score to the student "A", and hence to score higher marks in future tests or to improve the performance of the student or to enhance learning outcomes. In this example, the one or more goals defines magnitude of change (from 0.50 to 0.75) in the behavioural attribute "first look time" and a direction (positive) to increase the percentile score. In other words, the one or more goals recommends the student "A" to spend more time (time determined based on the preferred percentile score) on the question paper to improve the performance in similar tests, for example. As described, the recommendation engine 235 is also configured for estimating the improvement in the student's performance based on the change or the magnitude and the direction of change in the behavioural attribute toward the preferred percentile score. In other words, the recommendation engine 235 is configured for incentivizing the students about the possible improvement in their performance. Accordingly in this example, referring to FIG. 3, the recommendation engine 235 estimates the improvement in the total score as form "75" to "85", and recommends it to the student "A" to improve the "first look time" behavioural attribute from 0.50 percentile to 0.75 percentile to obtain an improvement in the score by 10 (from 75 to 85) in the overall test score.

In another example, for a student "B" having a percentile score of "0.875", the recommendation engine 235 compares the percentile score of the student "B" for the behavioural attribute "first look time" with the preferred percentile score "0.75". Then the recommendation engine 235 generates and recommends one or more goals to improve the percentile score to the student "B", and hence to score higher marks in future tests or to improve the performance of the student or to enhance learning outcomes. In this example, the one or more goals defines magnitude of change (from 0.875 to 0.75) in the behavioural attribute "first look time" and a direction (negative) to decrease the percentile score. In other words, the one or more goals recommends the student "B" to spend less time (time determined based on the preferred percentile score) on the question paper to improve the performance in similar tests, for example. Hence, the system recommends the change in the at least one behavioural attribute and the magnitude of change and the direction of change in the at least one behavioural attribute based on at least one of the percentile score of the at least one user for the at least one behavioural attribute, and the percentile scores of one or more users among the plurality users for the at least one behavioural attribute, in relationship with an effect of the at least one behavioural attribute.

In one embodiment of the present disclosure, the behavioural attribute analyser 220 is further configured for deriving one or more behavioural traits exhibited by the each of the plurality of students from the value assigned to the one or more behavioural attributes of the each of the plurality of students. The behavioural traits as described herein may be one or more of a lack of intent, boredom, attention gaps, stamina, carelessness, overconfidence, fear, pressure, fluke, time management, prioritization etc. In one embodiment of the present disclosure, the one or more behavioural traits exhibited by each of the plurality of students are derived based on a pre-determined correlation between the one or more behavioural traits and the one or more behavioural attributes, and the value assigned to the one or more behavioural attributes. Further, the behavioural attribute analyser 220 calibrates the one or more behavioural attributes based on at least one of the student activity data, the context of the activity and the student's profile. For example, for a given question for a given student, if the behavioural attribute tagged is "Too Fast" and the student is proficient on the concept, then the behavioural traits may be inferred as "Confidence", for example. On the other hand, if the behavioural attribute tagged is "Too Fast" and the student is not proficient on the concept (incompetency on that concept), then the behavioural traits may be inferred as "Fluke", for example. Based on the one or more behavioural traits derived from the one or more behavioural parameters, the recommendation engine 235 is also configured for recommending a change in the one or more behavioural traits of the each of the plurality of users, in relationship with an effect of the at least one behavioural attribute.

As described, the one or more goals, defining a change or a magnitude of change and a direction of change in a behavioural attribute, are generated and recommended for each of the plurality of students for each of one or more behavioural attributes in order to help the student to score higher marks in future tests or to improve the performance of the student or to enhance learning outcomes.

In one embodiment of the present disclosure, a progressive goal setting algorithm is used for recommending progressive goals to improve the behaviour of the students, wherein the progressive goal setting algorithm uses relative percentile jump/quantile jump method to set progressive goals for the students. In this method, the recommendation engine 235 uses the current percentile score of the student for a given behavioural attribute and computes the range between current percentile score and the preferred percentile score derived from the percentile scores of the one or more students among the plurality of students, for the same behavioural attribute. Then the recommendation engine 235 divides the range into quantiles and recommends goal or target percentile score to the students. Further, the recommendation engine 235 recommends, to the at least one student, one or more goals defining changes in the one or more behaviour attributes, the magnitude of change and the direction of change in the one or more behavioural attributes based on the behavioural traits or behavioural attributes of the one or more students who are at the preferred percentile score, in order to help the student to score higher marks in future tests or to improve the performance of the student or to enhance learning outcomes.

In one example, considering four relative quartiles, the student is given the goal to improve an attribute so that the student can improve by 25% of students who are currently better than him. For every relative quartile jump target, the recommendation engine 235 computes estimated score improvement by taking the difference between current percentile score and the score at goal percentile/target percentile. Further, in one embodiment of the present disclosure, the one or more behavioural attributes are ranked based on likelihood of the possible impact on learning outcomes of the student, and the student is recommended accordingly. For example, referring back to FIG. 3, for the student "A" the recommendation engine 235 divides the range into two quantiles (0.5 to 0.625 and 0.625 to 0.75) and initially recommends the one or more goals to increase the percentile score to "0.625". Then the recommendation engine 235 recommends further one or more goals to increase the percentile score from "0.625" to "0.75".

Figure 4:
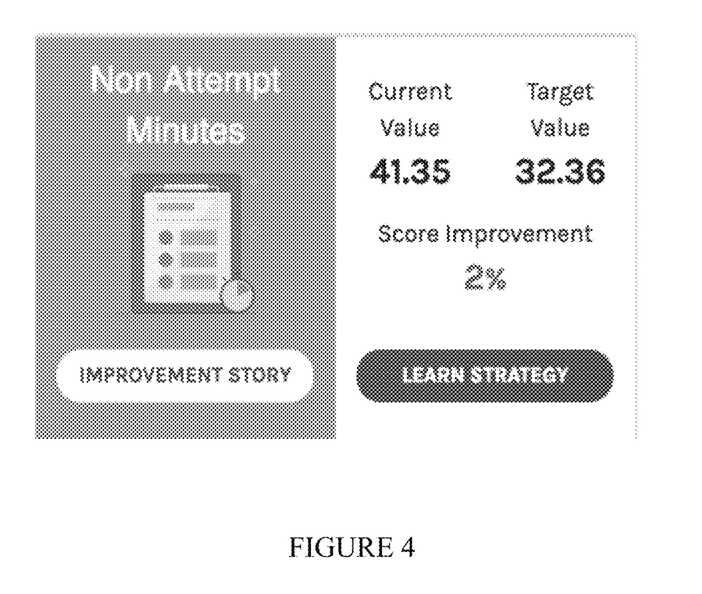
FIG. 4 illustrates an exemplary interface displaying progressive goals to a student in accordance with an embodiment of the present disclosure.

The recommendations, target scores, current standings, and other information are communicated to the students, that is to the user device, as web or application notifications, results, graphs, or in any known data representation methods known in the art. FIG. 4 illustrates an exemplary interface displaying progressive goals to a student in accordance with an embodiment of the present disclosure. As shown, in one implementation, the system provides current percentile score (for example, 41.35) of the student for a behavioural attribute "Non Attempt Time" (the ratio of time spent on non-attempts to total time spent) and a target percentile score (for example, 32.36) for achieving 2% improvement in the total score for any given test, which is an effect of the behavioural attribute "Non Attempt Time" on the performance of the student. As described in the present disclosure, the "2% improvement" for example, is estimated based on the change or the magnitude and the direction of change in the behavioural attribute "Non Attempt Time" toward the preferred percentile score.

In another embodiment of the present disclosure, progressive goals for a student are determined and recommend by grouping the plurality of students in different cohorts. That is, the plurality of students who attended the given online test or performed similar activities are grouped in different cohorts based on their total scores (for example marks) in the given online test. In one example, the plurality of students who attended the given online test are grouped in three cohorts where highest performing students are grouped as "Achievers", whereas lowest performing students are grouped as "Fighters" and students with moderate performance are grouped as "Performers". It is to be noted that the grouping is done based on the total scores obtained by the students in the given test. For example, for a test with maximum score of 300, the students who scored "200" to "300" are grouped as "Achievers", the students who scored "100" to "200" are grouped as "Performers" and the students who scored "0" to "100" are grouped as "Fighters". In such implementation, the recommendation engine 235 uses the current percentile score of a student for a given behavioural attribute and computes the range between current percentile score and the preferred percentile score in the same cohort among the other students (of the same cohort) for the same behavioural attribute. Then the recommendation engine 235 divides the range into quantiles (two or more buckets) and recommends goal or target percentile score, which is one of a relative percentile jump. Further, the recommendation engine 235 recommends changes in the one or more behavioural attributes, the magnitude of change and a direction of change in the one or more behavioural attributes based on the goal, behavioural traits and behavioural attributes of the other students (of same cohort) who are at the target percentile score, to positively change the behaviour of the student and hence to help the student to score higher marks in future tests or to improve the performance of the student or to enhance learning outcomes.

Figure 5:
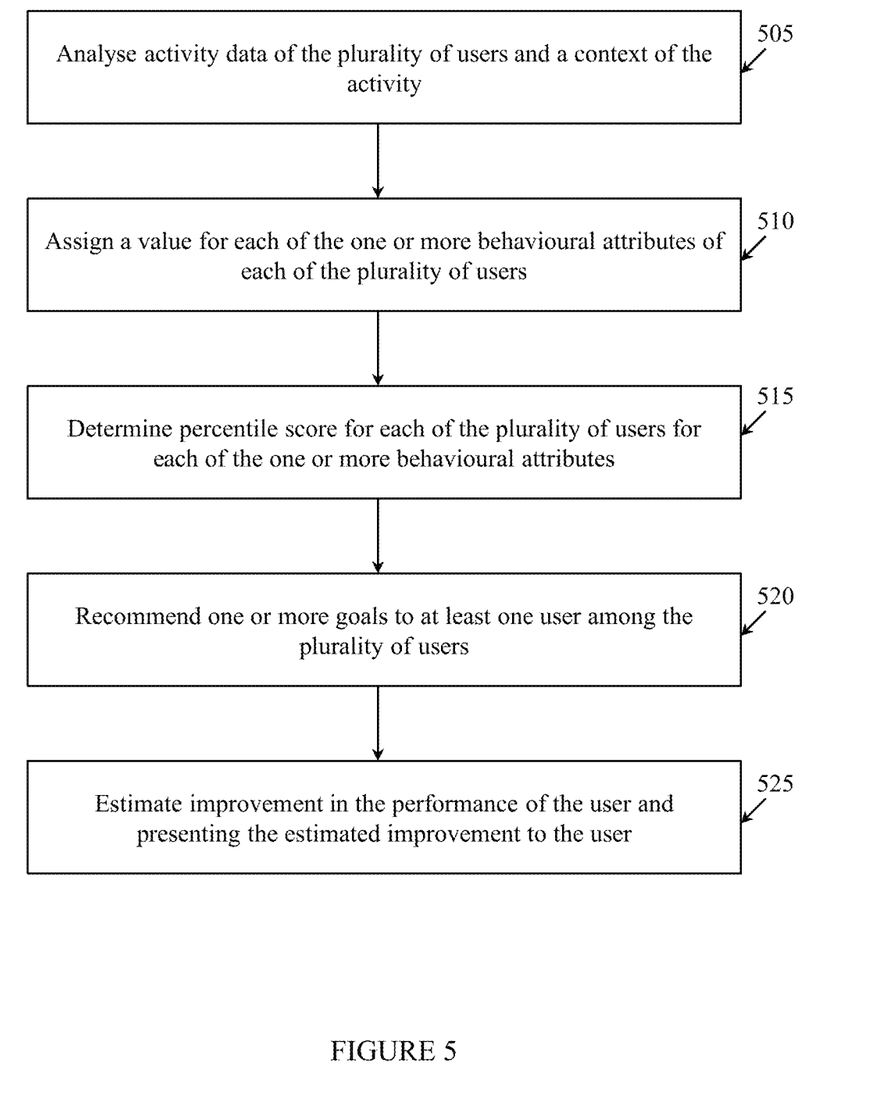
FIG. 5 is a flowchart illustrating a method of behavioural analysis and recommendations in accordance with an embodiment of the present disclosure.

FIG. 5 is a flowchart illustrating a method of behavioural analysis and recommendations in accordance with an embodiment of the present disclosure. As described, behaviour of each of a plurality of users/students are analysed based on the activity of each of the plurality of users on the user device, and based on the analysis, a change in at least one behavioural attribute to at least one of the plurality of users for changing at least one effect of the behavioural attribute are recommended to at least one user among the plurality of user. The activity as described herein is "answering online test", and the user is a student for example.

At step 505, activity data of the plurality of users, the activity data obtained while each of the plurality of users is performing the activity on a user device, and a context of the activity is analysed for determining one or more predetermined behavioural attribute of each of the plurality of users. In one implementation, the behavioural attribute determination module 215 determines the one or more behavioural attributes of each of the plurality of users from the context of the activity and the activity data obtained in real-time or near real-time.

At step 510, a value is assigned for each of the one or more behavioural attributes of each of the plurality of users based on at least one of, user activity data, context of an activity, and a user's profile. Considering one user, the behavioural attribute analyser 220 assigns a value for each of the one or more behavioural attributes of the user based on at least one of, the user activity data, the context of the activity, and profile of the user. For example, a value is assigned for the behavioural attribute "Overtime" based on the time taken for an attempt on the question (user activity data) in comparison with the ideal time to solve the given question (context of the activity), and the proficiency of the user/student (user's profile).

At step 515, a percentile score for each of the plurality of users for each of the one or more behavioural attributes is determined. In one embodiment, the percentile scoring module 225 determines the percentile score for each of the plurality of users for each of the one or more behavioural attributes based on the assigned values associated with each of the one or more behavioural attributes of other user among the plurality of users performing the activity. In other words, considering one user and one behavioural attribute, a percentile score for the user for the behavioural attribute is determined based on values associated with the behavioural attribute of other users performing the activity.

At step 520, one or more goals are recommended to at least one user among the plurality of users. In one embodiment, the recommendation engine 235 determines a preferred percentile score based on the percentile scores of the plurality of users, for the at least one behavioural attribute and preferred effect of the behavioural attribute. The generates and recommends the one or more goals to the at least one user based on the percentile score of the user for the at least one behavioural attribute and the preferred percentile score, wherein the one or more goals define a change in the at least one behavioural attribute and a magnitude of change and a direction of change in the at least one behavioural attribute, and recommended to help the user to improve the performance or to enhance learning outcomes or both.

Further, at step 525, improvement in the performance of the user is estimated and presented, along with the one or more goals, to the user for incentivizing the students about the possible improvement in their performance. In one embodiment, the improvement in the performance is estimated based on at least one of the change in the at least one behavioural attribute, the magnitude of change, and the direction of change in the at least one behavioural attribute, as described in the present disclosure.

As described, for sake of brevity and ease of understanding, the present disclosure is described by considering an example of a plurality of students attending an online test, an academic activity. However, method and the system may be implemented for analysing behaviour of users performing any similar activity on a user device, and for recommending changes in the at least one behavioural attribute and a magnitude of change and a direction of change in the at least one behavioural attribute to improve the learning outcomes.

While the system and method have been described with the view of improving the performance of a user with reference to learning, it is to be understood that the success of the method and the system in achieving an improvement in the user's performance is subject to the user putting in the required effort, the user's innate ability, and the time available to effect the required change, and so on, for example. However it must be noted that the system and method are oriented towards a motivated user and if the recommendations of the system and method are implemented, the probability of achieving the desired improvement increases. Further, it is to be noted that the method inherently uses statistics and statistical methods to determine a recommendation to a user for the user to achieve desired results, in this case, improvement in the user's performance, and hence the achievement is subject to probability. However, the inventors have had the insight that these statistics and statistical methods are of importance and have used that insight to come up with the disclosed system and method.

The system and method disclosed in the present disclosure assist the users in a hyper-personalized manner on a digital platform for education. The system calibrates the on one or more behavioural attributes, determines behavioural strength and weakness, and recommends changes in the one or more behaviour attributes, the magnitude of changes and direction of changes in the one or more behavioural attributes to the user in order to help the user to improve the performance or to enhance learning outcomes or both.

As described, it is to be noted that the system may be implemented, with or without minor modifications, for analysing the students behavioural attributes, behavioural traits, and recommending the students in order to help the student to achieve higher learning outcomes in future academic activities, for example to improve test scores, performance in practises, engagement in learning, and the like.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible.

We claim:

1. A method for analysing behaviour of each of a plurality of users, each performing an academic activity on a user device, for recommending a change in at least one behavioural attribute to at least one of the plurality of users for changing at least one effect of the behavioural attribute, the method comprising:

obtaining academic activity data comprising clickstream events generated by a mouse, comprising clicks, navigations, time duration between clicks, and user's facial expression of each of the plurality of users captured using a camera of the user device while each of the plurality of users is performing the academic activity on the user device, the academic activity comprising choosing an answer option, changing an answer option, marking a question for review, attempting a question, swapping subjects, and navigating to different webpages;

analysing the academic activity data of the plurality of users and a context of the academic activity for determining one or more behavioural attributes of each of the plurality of users;

assigning a value for each of the one or more behavioural attributes of each of the plurality of users based on one or more of, the user's academic activity data, the context of the academic activity, and a profile of each user;

determining a percentile score for each of the plurality of users for each of the one or more behavioural attributes;

determining a preferred percentile score for each of the one or more behavioural attributes;

generating one or more goals based on the percentile score of the at least one user for the at least one behavioural attribute and the preferred percentile score, in relationship with effect of the at least one behavioural attribute; and presenting and recommending the one or more goals to the at least one user through the user device associated with the user, wherein the one or more goals defining a change in at least one behavioural attribute, a magnitude of change, and a direction of change in the at least one behavioural attribute for enhancing learning outcomes of the at least one user.

2. The method as claimed in claim 1, wherein the one or more goals are recommended along with an estimated improvement in the performance of the user, wherein the improvement in the performance is estimated based on at least one of the changes in the at least one behavioural attribute, the magnitude of change, and the direction of change in the at least one behavioural attribute.

3. The method as claimed in claim 1, comprising:
deriving one or more behavioural traits exhibited by each of the plurality of users based on a pre-determined correlation between the one or more behavioural traits and the one or more behavioural attributes, and the value assigned to the one or more behavioural attributes of the each of the plurality of users; and
recommending a change in the one or more behavioural traits of the each of the plurality of users, in relationship with an effect of the at least one behavioural attribute.

4. A system for analysing behaviour of each of a plurality of users during their use of their user devices for performing an academic activity and recommending a change in at least one behavioural attribute to at least one of the plurality of users, for achieving a change in at least one effect of the behavioural attribute, the system comprising:
a mouse;
a camera;
a behavioural attribute derivation module configured for analysing academic activity data of the plurality of users, and a context of the academic activity, the academic activity data obtained while each of the plurality of users is performing the academic activity on the user device, for determining one or more behavioural attributes of each of the plurality of users, wherein the academic activity data comprise click-stream events generated by the mouse, comprising clicks, navigations, time duration between clicks, and user's facial expression captured using the camera of the user device, associated with the academic activity comprising choosing an answer option, changing an answer option, marking a question for review, attempting a question, swapping subjects, and navigating to different webpages;
a scoring module configured for assigning a value for each of the one or more behavioural attributes of each of the plurality of users based on at least one of, the user's academic activity data, the context of the academic activity, and a profile of each user;
a percentile scoring module configured for:
determining a percentile score for each of the plurality of users for each of the one or more behavioural attributes; and
determining a preferred percentile score for each of the one or more behavioural attributes; a recommendation engine configured for:
generating one or more goals based on the percentile score of the at least one user for the at least one behavioural attribute and the preferred percentile score, in relationship with effect of the at least one behavioural attribute; and
presenting and recommending the one or more goals to the at least one user through the user device associated with the user, the one or more goals, the one or more goals defining a change in the at least one behavioural attribute, a magnitude of change, and a direction of change in the at least one behavioural attribute for enhancing learning outcomes of the at least one user.

5. The system as claimed in claim 4, wherein the system comprises a behavioural attribute analyser configured for deriving one or more behavioural traits exhibited by each of the plurality of users from the value assigned to the one or more behavioural attributes of the each of the plurality of users.

6. The method as claimed in claim 3, wherein the one or more behavioural traits comprise, a lack of intent, boredom, attention gaps, stamina, carelessness, overconfidence, fear, pressure, fluke, time management, and prioritization.

* * * * *